(12) United States Patent
Nesbitt et al.

(10) Patent No.: US 7,689,349 B1
(45) Date of Patent: Mar. 30, 2010

(54) AUTOMATIC DETERMINATION OF A SURROGATE ORIGIN FOR PERSONALIZED ROUTING

(75) Inventors: David W. Nesbitt, Adamstown, MD (US); G. Duane Gearhart, Hummelstown, PA (US); Michael Dean Swartz, East Prospect, PA (US)

(73) Assignee: AOL LLC, Dulles, VA (US)

( * ) Notice: Subject to any disclaimer, the term of this patent is extended or adjusted under 35 U.S.C. 154(b) by 1126 days.

(21) Appl. No.: 11/319,234

(22) Filed: Dec. 28, 2005

Related U.S. Application Data

(63) Continuation-in-part of application No. 11/019,550, filed on Dec. 23, 2004, now Pat. No. 7,395,153.

(60) Provisional application No. 60/668,969, filed on Apr. 7, 2005.

(51) Int. Cl.
*G01C 21/34* (2006.01)
(52) U.S. Cl. .................... 701/201; 701/209
(58) Field of Classification Search .................. None
See application file for complete search history.

(56) References Cited

U.S. PATENT DOCUMENTS

| | | | |
|---|---|---|---|
| 5,311,173 A | 5/1994 | Komura et al. | |
| 5,504,482 A | 4/1996 | Schreder | |
| 5,508,930 A | 4/1996 | Smith, Jr. | |
| 5,513,110 A | 4/1996 | Fujita et al. | |
| 5,752,217 A | 5/1998 | Ishizaki et al. | |
| 5,802,492 A | 9/1998 | DeLorme et al. | |
| 5,938,720 A | 8/1999 | Tamai | |
| 5,944,768 A * | 8/1999 | Ito et al. ................ | 701/200 |
| 5,948,040 A | 9/1999 | DeLorme et al. | |
| 6,049,753 A | 4/2000 | Nimura | |
| 6,085,147 A | 7/2000 | Myers | |
| 6,282,489 B1 | 8/2001 | Bellesfield et al. | |
| 6,338,021 B1 | 1/2002 | Yagyu et al. | |
| 6,349,261 B1 | 2/2002 | Ohnishi et al. | |
| 6,351,707 B1 | 2/2002 | Ichikawa | |
| 6,356,911 B1 | 3/2002 | Shibuya | |
| 6,526,348 B1 | 2/2003 | McDonough | |
| 6,577,937 B1 | 6/2003 | Shuman et al. | |
| 6,600,994 B1 * | 7/2003 | Polidi ........................ | 701/209 |
| 6,636,805 B1 * | 10/2003 | Tada et al. ................ | 701/209 |
| 2001/0021895 A1 | 9/2001 | Yamazaki | |
| 2001/0047241 A1 | 11/2001 | Khavakh et al. | |
| 2002/0011941 A1 | 1/2002 | Endo et al. | |
| 2002/0067728 A1 | 6/2002 | Okamoto | |
| 2002/0077745 A1 | 6/2002 | Ohmura et al. | |
| 2003/0195701 A1 * | 10/2003 | Ohler ........................ | 701/209 |
| 2004/0098194 A1 * | 5/2004 | Baur et al. ................ | 701/209 |

(Continued)

FOREIGN PATENT DOCUMENTS

WO         WO 00/22593         4/2000

OTHER PUBLICATIONS

"Streets & Tips 2004, Using Streets & Trips"; http://www.microsoft.com/streets/webcomparison/default.asp; 1 page; (Jul. 3, 2004).

(Continued)

*Primary Examiner*—Michael J. Zanelli
(74) *Attorney, Agent, or Firm*—Fish & Richardson P.C.

(57) ABSTRACT

A surrogate origin is substituted for a user-entered or system-determined origin, and maneuvers for a route from the surrogate origin to a destination are determined and presented to the user as driving directions. A surrogate origin may be pre-selected or pre-configured for a user identity.

15 Claims, 9 Drawing Sheets

U.S. PATENT DOCUMENTS

2005/0256635 A1* 11/2005 Gardner et al. .............. 701/201

OTHER PUBLICATIONS

"Streets & Tips 2004, Preferences"; http://www.microsoft.com/streets/useit/preferences.asp; 1 page; (Jul. 3, 2004).

"Cosmi, Streets Maps USA"; http://www.cosmi.com/html/product%20pages/productivity/street_maps.htm; 1 page; (Jul. 3, 2004).

"Microsoft MapPoint 2004, Fact Sheet, Sep. 2003", pp. 1-6; (Sep. 2003).

* cited by examiner

FIG. 4A

| Link Identifier | Link Classification | Computed Turn Angle | Signed Direction | Sign Information | Road Name | Compass Direction | Node Identifiers | Distance | Time |
|---|---|---|---|---|---|---|---|---|---|
| 410 | 412 | 414 | 416 | 418 | 420 | 422 | 424 | 426 | 428 |

| NODE IDENTIFIER | LATITUDE INDICATOR | LONGITUDE INDICATOR | TOTAL LINK COUNT |
|---|---|---|---|
| 432 | 434 | 436 | 438 |

424

430 / 400

AUTOMATIC DETERMINATION OF A SURROGATE ORIGIN FOR PERSONALIZED ROUTING

CROSS REFERENCE TO RELATED APPLICATIONS

This application claims the benefit of U.S. Provisional Application No. 60/668,969, filed Apr. 7, 2005, and titled AUTOMATIC DETERMINATION OF A REVISED ORIGIN FOR PERSONALIZED ROUTING, which is incorporated by reference in its entirety. This application is a continuation-in-part of U.S. application Ser. No. 11/019,550, filed Dec. 23, 2004, now U.S. Pat. No. 7,395,153 and titled REDUCING DRIVING DIRECTIONS, which is incorporated by reference in its entirety.

TECHNICAL FIELD

This description relates to presenting driving directions for a travel route between an origin location and a destination location.

BACKGROUND

A travel route between an origin location and a destination location may be determined by a computer system, which may be referred to as a mapping system. The mapping system may make this determination by searching for an optimal path through a directed graph (e.g., a collection of nodes and edges) that represents a network of roads and intersections. Each edge (or link) of the graph may represent a road in a map, and each node of the graph may represent an intersection of two or more roads or a terminal point of a road, such as a dead end road. A user of a mapping system may want to see driving directions, which may be in the form of maneuvers in the travel route with a narrative description of each maneuver to be made.

SUMMARY

In one general aspect, driving directions having multiple maneuvers are able to be displayed by receiving an origin is received, and accessing mapping information stored in a computer storage medium. A surrogate origin for the received origin is identified, and the mapping information is used to determine a route from the surrogate origin to a destination.

Implementations may include one or more of the following features. For example, the mapping information may include a routing graph representing a network of roads including two or more nodes and one or more links, with each link being associated with at least two nodes. Receiving an origin may include determining the origin based on a default origin or may include receiving an indication of a geographic location of a navigation device. An indication may be received of an identity associated with a requestor of directions, and the origin may be set to a default origin associated with the identity.

Information may be accessed that is stored in a computer storage medium and that is associated with a user identity on behalf of which the driving directions are being enabled for display. A surrogate origin may be identified from the accessed information that is associated with the user identity. The route may be communicated to a user system associated with a requestor of directions.

A set of maneuvers to be executed to traverse the route from the surrogate origin to the destination may be generated. Identification of the surrogate origin may be enabled through inspection of the set of maneuvers generated. A requestor of directions may be able to identify the surrogate origin and may be able to identify one of multiple presented locations as the surrogate origin.

The identified surrogate origin may be stored in association with an identity associated with the requestor of directions. A person may be able to identify a default surrogate origin to be later used to determine a route from the default surrogate origin to a destination, and the default surrogate origin may be stored in association with a user identity that corresponds to the person.

The default surrogate origin may be stored in association with a particular location or address, and the default surrogate origin may be identified as the surrogate origin for the received origin conditioned on whether the received origin is associated with the particular location or address associated with the default surrogate origin.

A person may be able to identity a default surrogate origin to be used as the surrogate origin when a destination is located in a particular travel direction with respect to the received origin, and the default surrogate origin may be used for the received origin conditioned upon on whether the destination is located in the particular travel direction with respect to the received origin.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 4A is a block diagram depicting an example data structure for link information used to generate a route from a surrogate origin to a travel destination.

FIG. 4B is a block diagram depicting an example data structure for node information used to generate a route from a surrogate origin to a travel destination.

Like reference symbols in the various drawings indicate like elements.

DETAILED DESCRIPTION

Techniques are provided for simplifying the number of maneuvers presented in narrative driving directions for a route to a destination location. To do so, a surrogate origin is substituted for a user-entered or system-determined origin. Maneuvers for the route from the surrogate origin to the destination are determined and presented to the user as driving directions. As a result, generally, driving directions are not provided for areas with which a person is likely to be familiar, such as the neighborhood near the person's house, office, or other location. This may help to simplify and make the driving directions provided for a route more meaningful to the requesting user. Moreover, a surrogate origin may be preselected or pre-configured for a user identity before the user requests driving direction. Identifying a surrogate origin to be later used in generating a route may be useful, particularly, for example, when a preferred starting location is not readily known to the requestor of the directions (such as when a preferred starting location is an intersection and the street address is required to be specified for an origin) or the preferred starting location is inconvenient or burdensome to identify as an origin of a route to be determined. This may occur, for example, in an urban location where many possible routes (some of which may be substantially equally convenient to use) exist and directions are only needed from a point outside of the city. In another example, a surrogate origin may be useful in a suburban setting in which there are many possible routes out of a neighborhood and the possible routes generally lead to a single location.

Driving directions beginning at a surrogate origin may be presented in a way that more closely approximates the style of person-to-person communication of directions. For example, a person may communicate driving directions by beginning from a familiar or commonly known point, rather than beginning from the actual starting location of the requester of directions.

Figure 1:
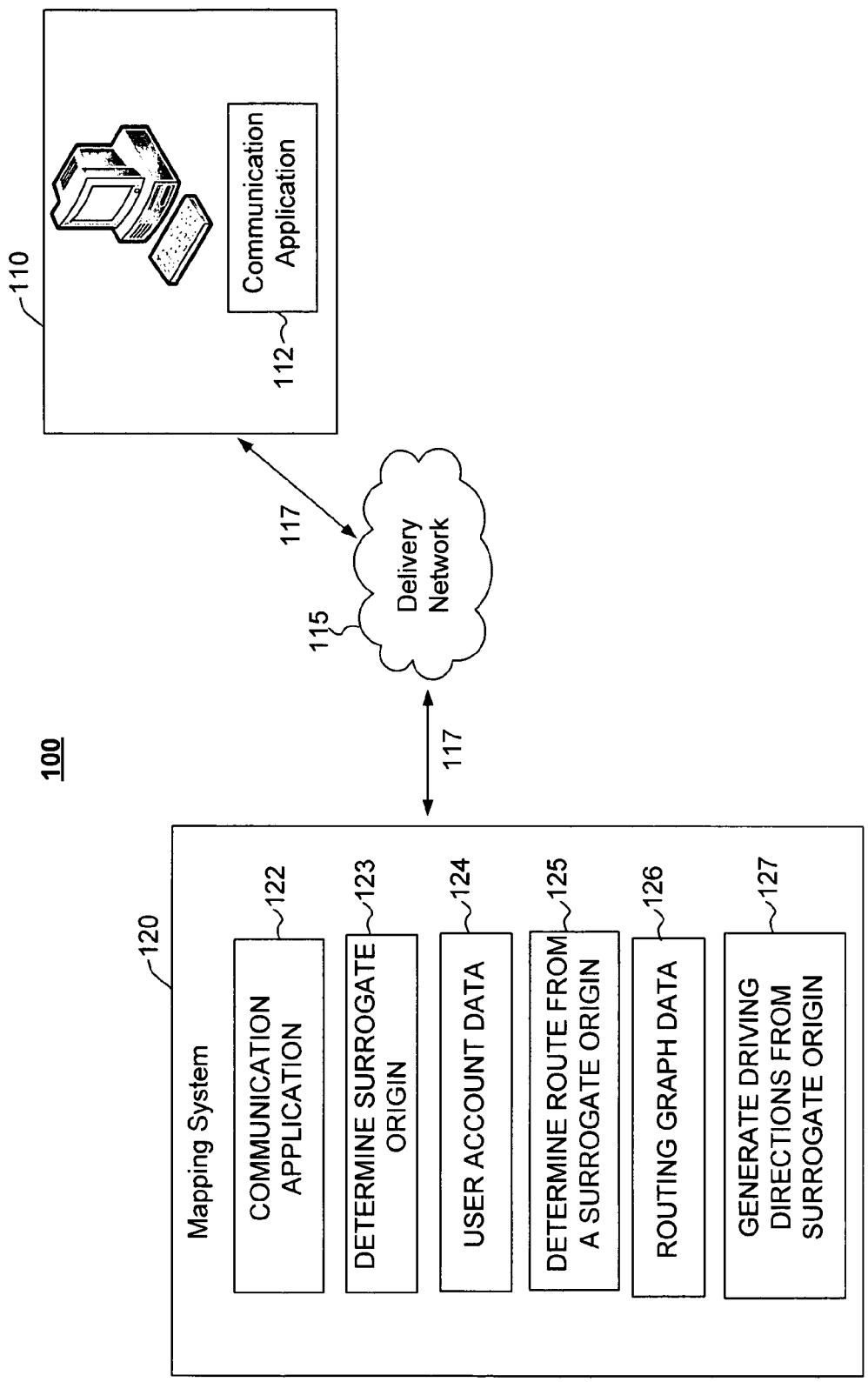
FIG. 1 is a block diagram of a communications system capable of presenting driving directions of a travel route from a surrogate origin to a travel destination.

Referring to FIG. 1, a communications system 100 is capable of substituting a surrogate origin for a user-entered origin and presenting narrative driving directions for a route from the surrogate origin location to a destination location. More particularly, the communications system 100 is capable of delivering and exchanging messages between either of a client system 110 and a mapping system 120 through a delivery network 115 to present simplified or tailored driving directions that include only maneuvers beginning from the surrogate origin. As such, the communications system 100 may help to minimize maneuvers presented for a geographical area known to the user and may generate a final set of maneuvers that are tailored to a destination, such as, for example, maneuvers that begin in the general direction of the destination.

Each of the client system 110 and the mapping system 120 may be a general-purpose computer (e.g., a personal computer, a desktop computer, or a laptop computer) capable of responding to and executing instructions in a defined manner. Other examples of the client system 110 and the mapping system 120 include a special-purpose computer, a workstation, a server, a device, a component, other physical or virtual equipment or some combination thereof capable of responding to and executing instructions. The client system 110 also may be a personal digital assistant (PDA), a communications device, such as a mobile telephone or a portable electronic mail (e-mail) device, or a mobile device that is a combination of a PDA and communications device.

The client system 110 also includes a communication application 112 and is configured to use the communication application 112 to establish a communication session with the mapping system 120 over the delivery network 115. The communication application 112 may be, for example, a browser or another type of communication application that is capable of accessing the mapping system 120. In another example, the communication application 112 may be a client-side application configured to communicate with the mapping system 120. The client system 110 is configured to send to the mapping system 120 requests for driving directions for a route identified by an origin location and a destination location. The client system 110 also is configured to receive driving directions from the mapping system 120 and to present the received driving directions to a user.

The delivery network 115 provides a direct or indirect communication link between the client system 110 and the mapping system 120, irrespective of physical separation. Examples of a delivery network 115 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 115 includes communication pathways 117 that enable the client system 110 and the mapping system 120 to communicate with the delivery network 115. Each of the communication pathways 117 may include, for example, a wired, wireless, virtual, cable or satellite communications pathway.

The mapping system 120 may receive instructions from, for example, a software application, a program, a piece of code, a device, a computer, a computer system, or a combination thereof, which independently or collectively direct operations, as described herein. The mapping system 120 includes a communications application 122 that is configured to enable the mapping system 120 to communicate with the client system 110 through the delivery network 115.

The mapping system 120 may be a host system, such as an Internet service provider that provides a mapping service to subscribers. In another example, the mapping system 120 may be a system that hosts a web site that provides mapping services to the general public. The mapping system 120 also may be implemented as an on-board or mobile navigation system that is located in a vehicle and configured to provide driving directions based on the vehicle's current location. In some implementations, an on-board navigation system also may be capable of communicating with another system, such as, for example, a host system to receive updated navigation data for use in determining a route or real-time routing information (such as information about traffic congestion or weather advisories).

In general, the mapping system 120 is configured to substitute a surrogate origin for a user-entered or programmatically identified origin and to provide driving directions for a route between the surrogate origin and a destination.

More particularly, the mapping system 120 includes code segments 123 configured to substitute a surrogate origin for a received origin by using user account data 124 that stores information related to preferences, including surrogate origin preferences, for a particular user identity. The user account data 124 may include, for a user identity, one or more addresses, each of which is associated with one or more surrogate origins. For example, a user may wish to obtain directions beginning at a particular intersection close to the user's home (rather than from the user's home address). In such a case, user account data for the user identifies the user's home address and a surrogate origin (e.g., an intersection from which directions are to be generated) to substitute for the user's home address when the user requests driving directions from the user's home address. The user account data 124 may include multiple addresses for a user identity to enable a user to identify surrogate origins for different addresses. A surrogate origin may represent a convenient indication of an area with which a user is familiar and for which directions are unnecessary. In one example, the code segments 123, when executed, access user account data 124 for the user identity who is requesting the route, determine whether an address associated with a surrogate origin in the user account data 124 matches the received origin, and, if so, substitutes the surrogate origin for the received origin.

The mapping system 120 also includes the code segments 125 that, when executed, determine a route from a surrogate origin to the destination location. The route from the surrogate origin to the destination location may be referred to, for example, as a surrogate route, a route with tailored maneuvers, a simplified route, a route with tailored or simplified driving directions, a route with tailored or simplified maneuvers, or a route from a surrogate origin. The mapping system 120 may generate the route by accessing and using routing graph data 126. The routing graph data 126 may be stored in persistent or non-volatile storage, though this need not necessarily be so. For example, mapping data for use in generating a particular route may be stored only in memory, such as random access memory, of the mapping system. In some implementations, the routing graph data 126 may be implemented as a collection of links and/or nodes that represent roads and intersections, respectively.

The mapping system also includes code segments 127 configured to generate driving directions for a route that includes a surrogate origin. The driving directions may be in the form of text, a marked route presented on a map, or a combination of text and a marked route. In some implementations, the driving directions may be oral driving directions that are generated using a text-to-speech process.

Figure 2:
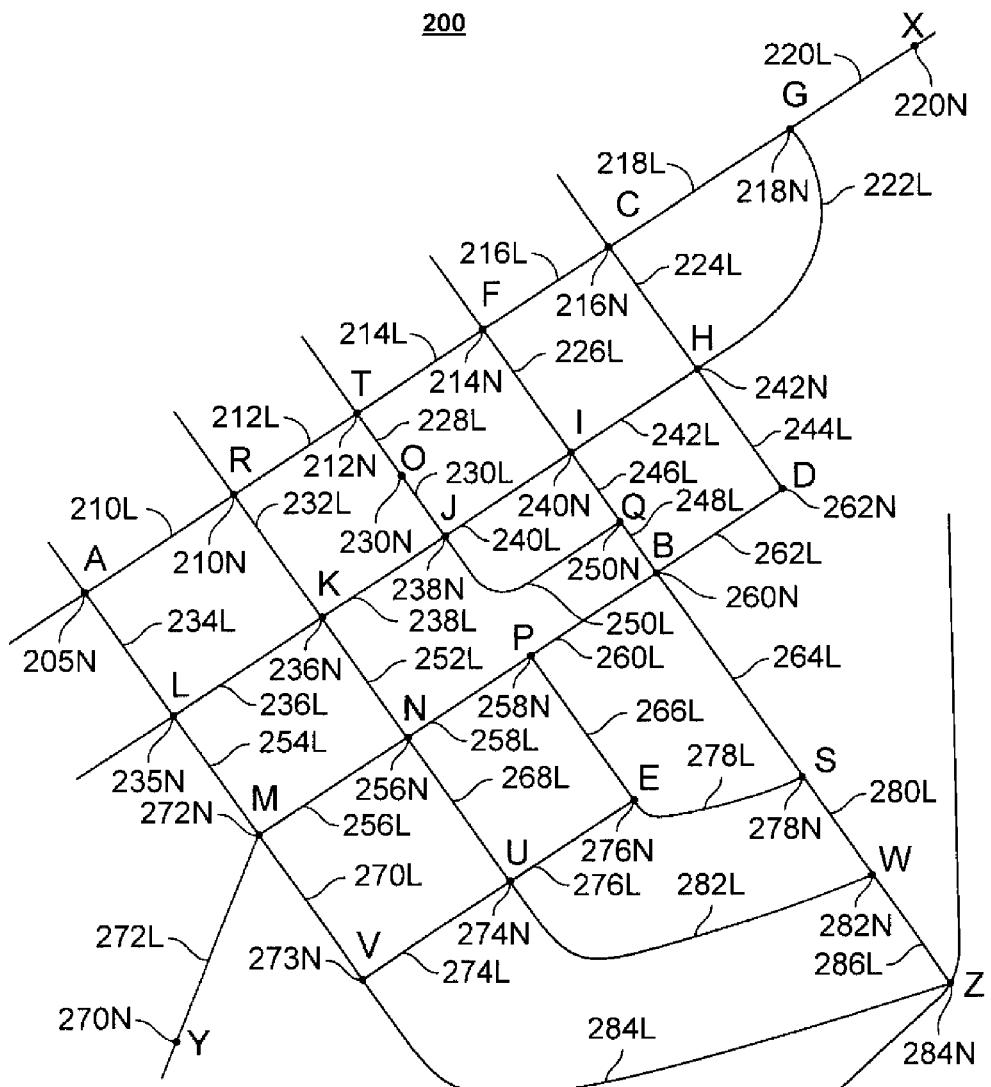
FIG. 2 is a diagram of example travel routes from a surrogate origin to a travel destination.

FIG. 2 illustrates, using a routing graph 200, examples of the ways in which a surrogate origin is substitute for an origin. The routing graph 200 illustrates roads in a neighborhood that are likely to be well known to the user who is requesting directions for a route and for which a surrogate origin may be substituted for purposes of determining a travel route.

The routing graph 200 is illustrated using a collection of links and nodes. A node on the routing graph 200 is represented by a point and is labeled by an uppercase alphabetic character (e.g., A, B, or C). A link on the routing graph 200 is represented by a link that connects two nodes. A link may be referenced using a pair of nodes. For example, the link between node A and node B may be referred to as link AB or as link BA.

The routing graph 200 includes links AR 210L, RT 212L, TF 214L, FC 216L, CG 218L, GX 220L, GH 222L, CH 224L, FI 226L, TO 228L, OJ 230L, RK 232L, AL 234L, LK 236L, KJ 238L, JI 240L, IH 242L, HD 244L, IQ 246L, QB 248L, KN 252L, JQ 250L, LM 254L, MN 256L, NP 258L, PB 260L, BD 262L, BS 264L, PE 266L, NU 268L, MV 270L, YM 272L, VU 274L, UE 276L, ES 278L, SW 280L, UW 282L, VZ 284L and WZ 286L. The routing graph 200 also includes nodes A 205N, R 210N, T 212N, F 214N, C 216N, G 218N, X 220N, O 230N, L 235N, K 236N, J 238N, I 240N, H 242N, Q 250N, N 256N, P 258N, B 260N, D 262N, Y 270N, M 272N, E 276N, S 278N, V 273N, U 274N, W 282N, and Z 284N.

In example of the routing graph 200, node 230N (i.e., node O) represents a user's home address. Nodes 236N (i.e., node K), node 260N (i.e., node B), and node 216N (i.e., node C) are surrogate origins associated with the user's home address (i.e., node O).

In one example using the routing graph 200, a user of a mapping system, which may be, for example, an implementation of mapping system 120 of FIG. 1, requests driving directions for a route from an origin at node O (i.e., the user's home address) to a destination location at node X. The mapping system accesses information associated with the user identity and identifies node O as a stored origin that has associated surrogate origins corresponding to nodes A, B, and C. The mapping system selects one of the surrogate origins to substitute for the origin based on proximity of the destination to the surrogate origins. This may be accomplished, for example, by comparing the location of the destination to location of each of the surrogate origins, and substituting the surrogate origin that is the closest to the destination for the received origin.

In some implementations, the mapping system compares the latitudes and longitudes of the surrogate origins associated with node O (i.e. nodes K, B, and C) with the latitude and longitude of the destination to determine the surrogate origin that is closest to the destination. In this example, the latitude and longitude of node C more closely approaches the destination node X than either of node K or node B.

Alternatively or additionally, the mapping system may determine the general compass direction to be traversed between the origin and the destination, and then may select the surrogate origin that lies in the determined general compass direction from the origin. For example, node X is generally north and east of node O, as is node C. As such, the mapping system selects node C to serve as the surrogate origin and determines a route from node C to node X that includes the links 218L and 220L. The mapping system then presents driving directions to the user for maneuvers beginning with node 216N (i.e., node C) and including links 218L and 220L. In this example, links from node O to node C (i.e., links 228L, 214L and 216L) were eliminated from the route to the destination of node X.

In a second example, a user of a mapping system requests driving directions from the same origin location, node O, to a destination location at node Y. The mapping system again accesses the information associated with the user identity, identifies node O as a stored origin, and identifies nodes K, B, and C as surrogate origins associated with O. The mapping system then selects node K as the surrogate origin because node K is the closest to node Y. The mapping system determines a route from node K to node Y that includes the links 252L, 256L and 272L. The mapping system then presents driving directions to the user for maneuvers beginning with node 236N (i.e., node K) and including links 252L, 256L, and 272L. In this example, links from node O to node K (i.e., links 230L and 238L) were eliminated from the route to destination of node Y.

Figure 3:
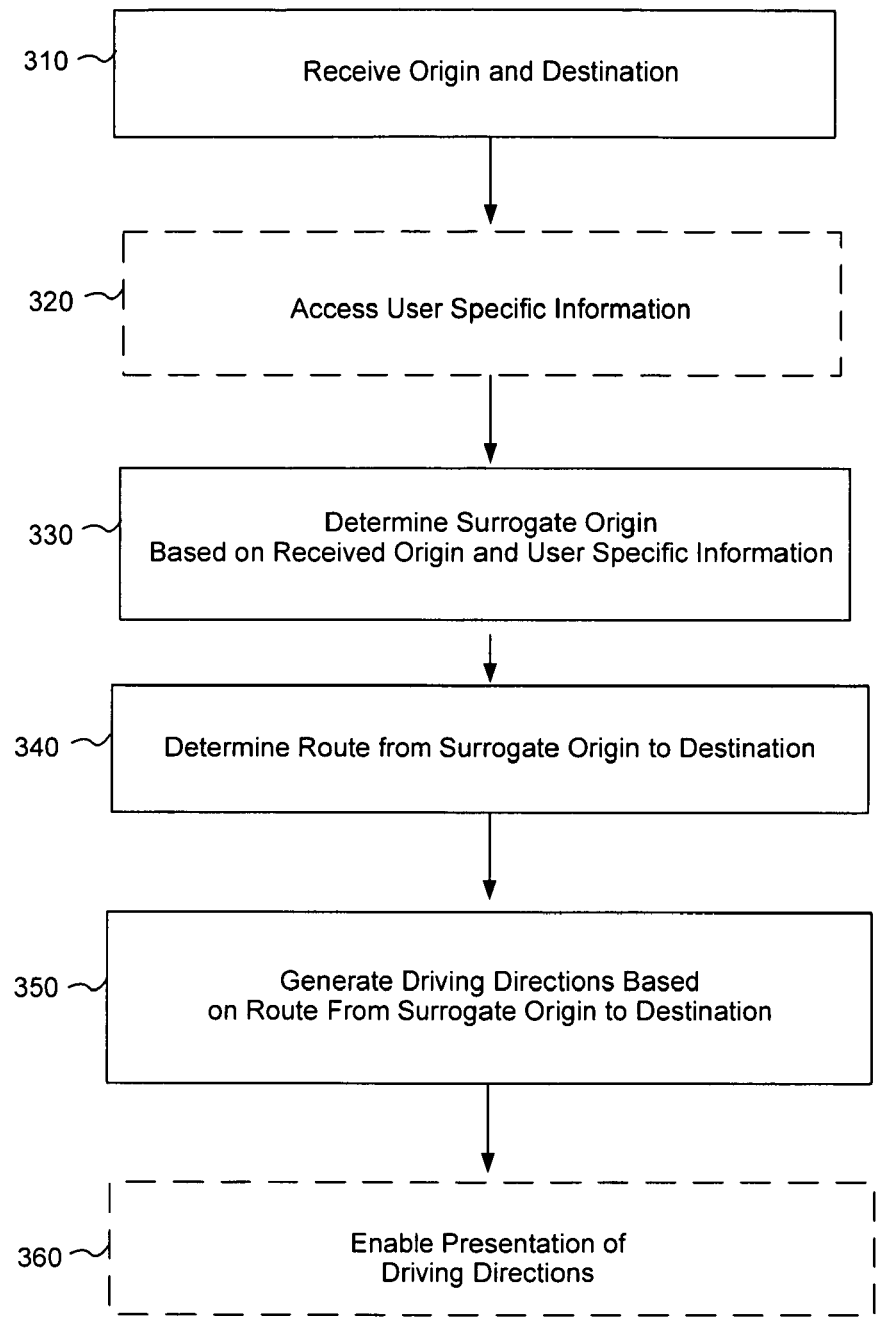
FIGS. 3 and 5 are flow charts of processes that may be used to substitute a surrogate origin for a user-identified origin and to generate driving directions from the surrogate origin to a travel destination.

FIG. 3 illustrates a process 300 for substituting a surrogate origin for a user-specified origin and generating driving directions from the surrogate origin to a destination. The process 300 may be performed by a mapping system, such as the mapping system 120 of FIG. 1.

The process begins when the mapping system receives an origin and a destination for a route to be determined (step 316). The received origin may be a link or a node in a network graph representing roads. The link or node is associated with an origin location from which the route is to start. Similarly, the received destination may be a link or a node at which the route is to end. When a node is received as an origin, a link that includes the origin node may be identified. In some implementations, the origin and the destination are received through user input, such as when a user selects a starting location from a list of starting locations, enters an address from which the route is to start, selects a starting location from a graphical map, or enters another type of identifier, such as a name of a well-known location, for a starting location. Examples of well-known locations include the White House in Washington, D.C. and the Empire State Building in New York, N.Y. The mapping system may identify a link or node that corresponds to the entered address or well-known location for use as a received origin. Alternatively or additionally, the origin may be determined based on the geographical position of a vehicle or a mobile device (such as a mobile telephone or a portable navigation system).

The mapping system accesses information associated with the user identity to identity at least one surrogate origin corresponding to the received origin (step 320). Such information may include addresses for origins, addresses for surrogate origins, and associations between origin addresses and surrogate origin addresses. The entered location (origin or surrogate origin) and/or a link or node corresponding to an entered location may be stored. The user information may be stored in a user profile or another form of user preference data store.

The mapping system determines a surrogate origin based on the received origin and user specific information (step 330). This may be accomplished, for example, when there is only one surrogate origin associated with an address in the user specific information, where the address corresponds to the received origin. When multiple surrogate origins are identified for an address that corresponds to the received origin, the mapping system may determine a surrogate origin based on proximity of a surrogate origin to the destination. When one or more surrogate origins are associated with the user identity and are not associated with a particular address, the mapping system may select a surrogate origin based on proximity of the surrogate origin to the destination or, perhaps, the origin. In some implementations, a surrogate origin may be selected based on a general travel direction, as described more fully later.

The mapping system determines route links for a route between the surrogate origin and the destination (step 340). This may be accomplished, for example, using route determination techniques to progressively search a network graph representing a network of roads beginning from the surrogate origin until the destination is reached. In one example, the mapping system may use the Dijkstra or A* method to determine an optimal route based on the distance and/or time required to travel between the surrogate origin and the destination.

The mapping system generates driving directions for the route between the surrogate origin and the destination (step 350). This may be accomplished, for example, by generating text for maneuvers that correspond to route links that are included in the route between the surrogate origin and the destination (step 350). Driving direction text may be generated by using text that corresponds to a type of maneuver that is used between two adjacent links in the route and identifying the name of the road associated with the second of the adjacent links. Examples of driving direction text include "merge onto I-495" and "turn right onto Beauregard Ave."

The mapping system optionally enables the presentation of the driving directions (step 360). For example, driving directions may be provided to a client system, such as the client system 110 of FIG. 1, or on an output device of a on-board or mobile navigation system for display. The driving directions also may be printed on a printer associated with a client system, or may be displayed on a display associated with a mobile telephone.

Additionally or alternatively, the mapping system may identify a surrogate origin by generating maneuvers for a route from the received origin to the destination and determining whether a surrogate origin is included on the route. When a surrogate origin is included in the route from the received origin to the destination, driving directions are generated from the surrogate origin rather than from the received route.

Referring to FIGS. 4A and 4B, a data structure 400 may be used to display link information for a route for which driving directions are presented. The data structure 400 may be used, for example, to provide route information to a process to tailor driving directions based on the likelihood that the same maneuvers are known to or undesired by the user of the driving directions. The data structure 400 includes a link data structure 405 and a node data structure 430.

The link data structure 405 includes a link identifier 410, a link classification 412, a computed turn angle 414, a signed direction 416, sign information 418, a road name 420, a compass direction 422, node identifiers 424, an optional distance 426 and an optional time 428 for traversing the link.

The link identifier 410 uniquely identifies a particular link to which the link information applies. The link classification 412 identifies the arterial category, such as an Interstate and/or a U.S. highway, that corresponds to the link. The computed turn angle 414 indicates the degree of angle involved in a turn from the link to another link in the route. The computed turn angle 420, for example, may be one of a sharp left, a sharp right, a slight left, a slight right, a merge, or straight.

The signed direction 416 indicates the travel direction of the road that corresponds to the link as indicated by posted signs along the road. A signed direction typically is one of north, south, east or west. Additionally or alternatively, the signed direction 416 may be stored in association with the road name (such as being stored as a suffix to the road name).

The sign information 418 indicates information about one or more exit signs that applies to the link. The road name 420 indicates the name of the road that corresponds to the link. Together, the link classification 412, the signed direction 416 and the road name 420 identify a particular road. For example, the particular road name "I-235 South" is identified using a link classification 412 of "Interstate," a signed direction 416 of "South" and a road name 420 of "235."

The compass direction 422 identifies the general direction of travel of a vehicle on a road that corresponds to the link. The compass direction 422 may be the same, or different from, the signed direction 416 of the link.

Referring also to FIG. 4B, the node data structure 430 includes a node identifier 424, a latitude indicator 434, a longitude indicator 436 and a total link count 438. The node identifier 424 uniquely identifies the particular node. The latitude indicator 434 and a longitude indicator 436 include latitude and longitude values for the geographical locations represented by a node. The total link count 438 indicates the total number of links that are adjacent to the node.

Figure 5:
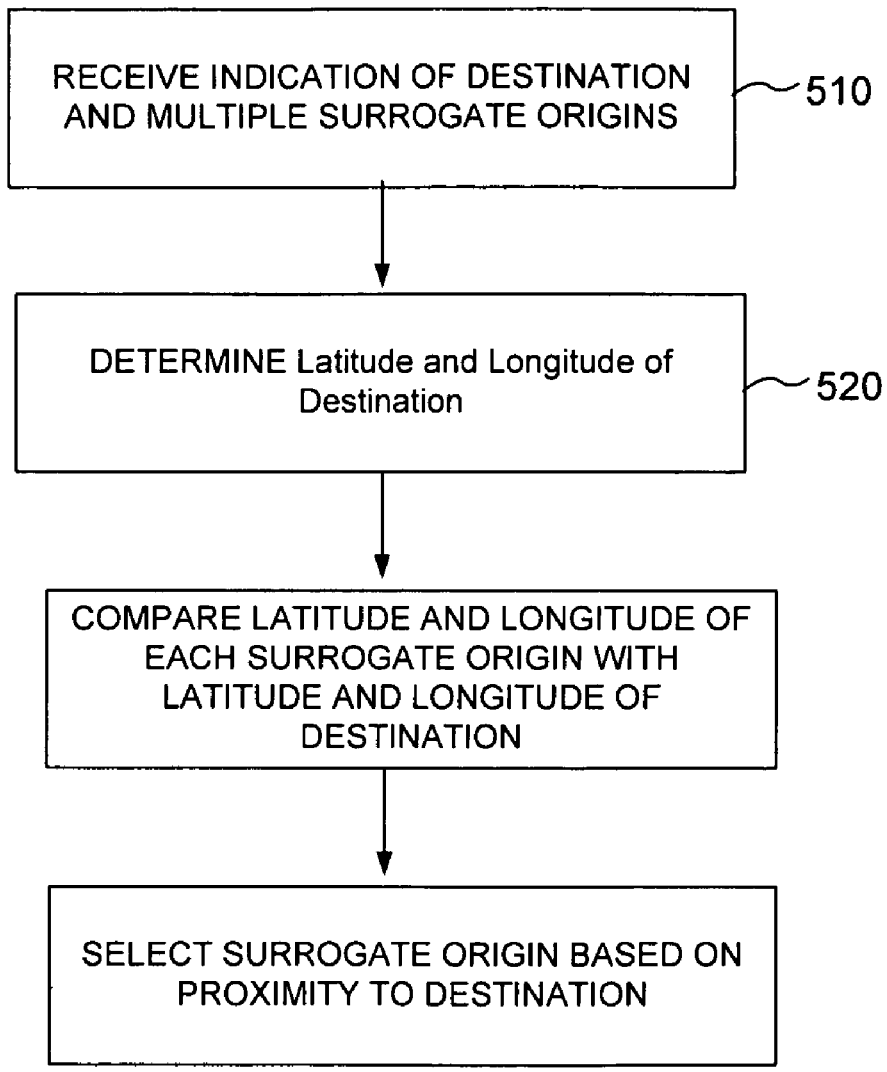

FIG. 5 illustrates a process 500 selecting a surrogate origin to be substituted for an origin where multiple surrogate origins are associated with a requestor of driving directions for a route between the origin and a destination. The process 500 may be performed by a mapping system, such as the mapping system 120 of FIG. 1. The process 500 may be initiated by the mapping system conditioned upon a determination that multiple surrogate origins are associated with a requestor of driving directions for a route between the origin and a destination.

The process 500 begins when the mapping system receives an indication of a destination and indications of multiple surrogate origins (step 510). For example, an indication of a destination (such as a particular node or link identifier in a routing data graph) and indications of surrogate origins (such as identifiers of nodes or links in a routing data graph) may be passed as parameters to a computer program executing the process 500.

The mapping system determines the latitude and longitude for the destination (step 520). This may be accomplished, for example, by looking up the latitude indicator 434 and longitude indicator 436 for a node identifier 412 in the node data structure 430 of FIG. 4B. The mapping system compares the latitude and longitude of each surrogate origin with the latitude and longitude of the destination (step 530) and selects the surrogate origin that is the closest to the destination to serve as the starting point of driving directions to the destination (step 540).

In some implementations, location information other than latitude/longitude may be used. For example, a geographic area may be divided into regions or a grid and a region or grid portion associated with a surrogate origin may be used to determine which of multiple surrogate origins are generally closest to a destination for a route.

Figure 6:
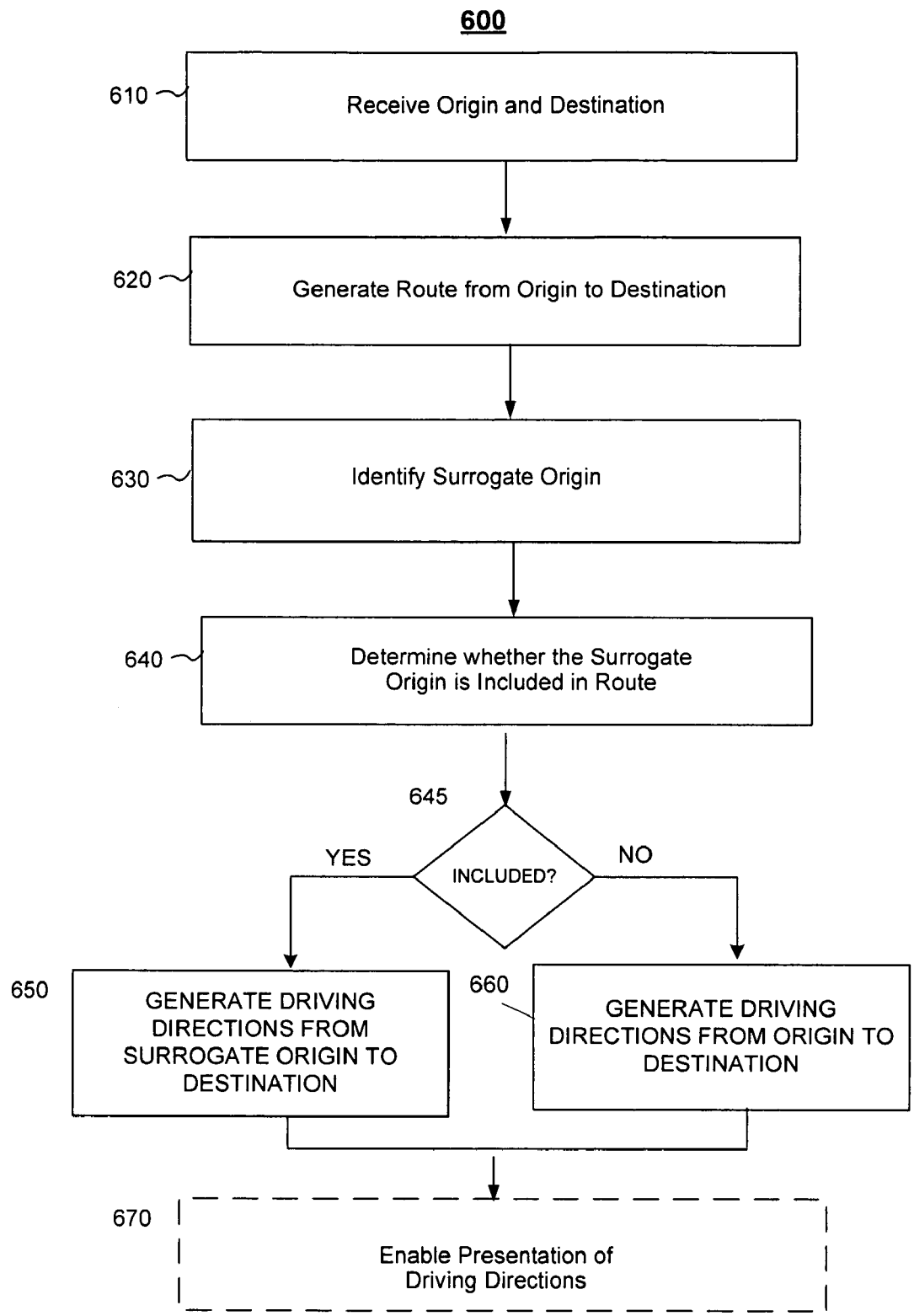
FIG. 6 is a flow chart of a process for determining driving directions from a surrogate origin to a travel destination.

FIG. 6 illustrates a process 600 for enabling presentation of driving directions from a surrogate origin to a destination. The process 600 may be performed by a mapping system, such as the mapping system 120 of FIG. 1.

The mapping system, when executing process 600, receives an origin and a destination (step 610) and generates a route from the origin to the destination (step 620). The mapping system identifies a surrogate origin (step 630). This may be accomplished, for example, by accessing user preference information to determine one or more surrogate origins that are associated with a particular user.

The mapping system determines whether the generated route includes the surrogate origin (step 640). When the mapping system determines that the generated route includes the surrogate origin (step 645), the mapping system generates driving directions from the surrogate origin to the destination (step 650). When the mapping system determines that the generated route does not include the surrogate origin (step 645), the mapping system generates driving directions from the origin to the destination (step 660). The mapping system optionally enables presentation of the generated driving directions to the destination (step 670).

In some implementations, multiple surrogate origins are received and a determination is made as to whether some or all of the surrogate origins are included in the generated route. When multiple surrogate origins are included in the generated route, conflict resolution techniques may be applied to select one of the surrogate origins to be used as a starting point for driving directions to the destination. In one example, a surrogate origin that is closest to the destination may be selected from the surrogate origins included in the route. In another example, a surrogate origin that is closest to the origin may be selected from the surrogate origins included in the route. Selecting a surrogate origin that is closest to the origin may be particularly appropriate for a short route or when the surrogate origin is within a predetermined distance of the origin. Selecting a surrogate origin that is closest to the destination may be particularly appropriate for a longer route or when the surrogate origin is within a predetermined distance of the destination.

In some implementations, driving directions may be generated from the origin to the destination and maneuvers may be trimmed from the driving directions based on a surrogate origin.

Figure 7:
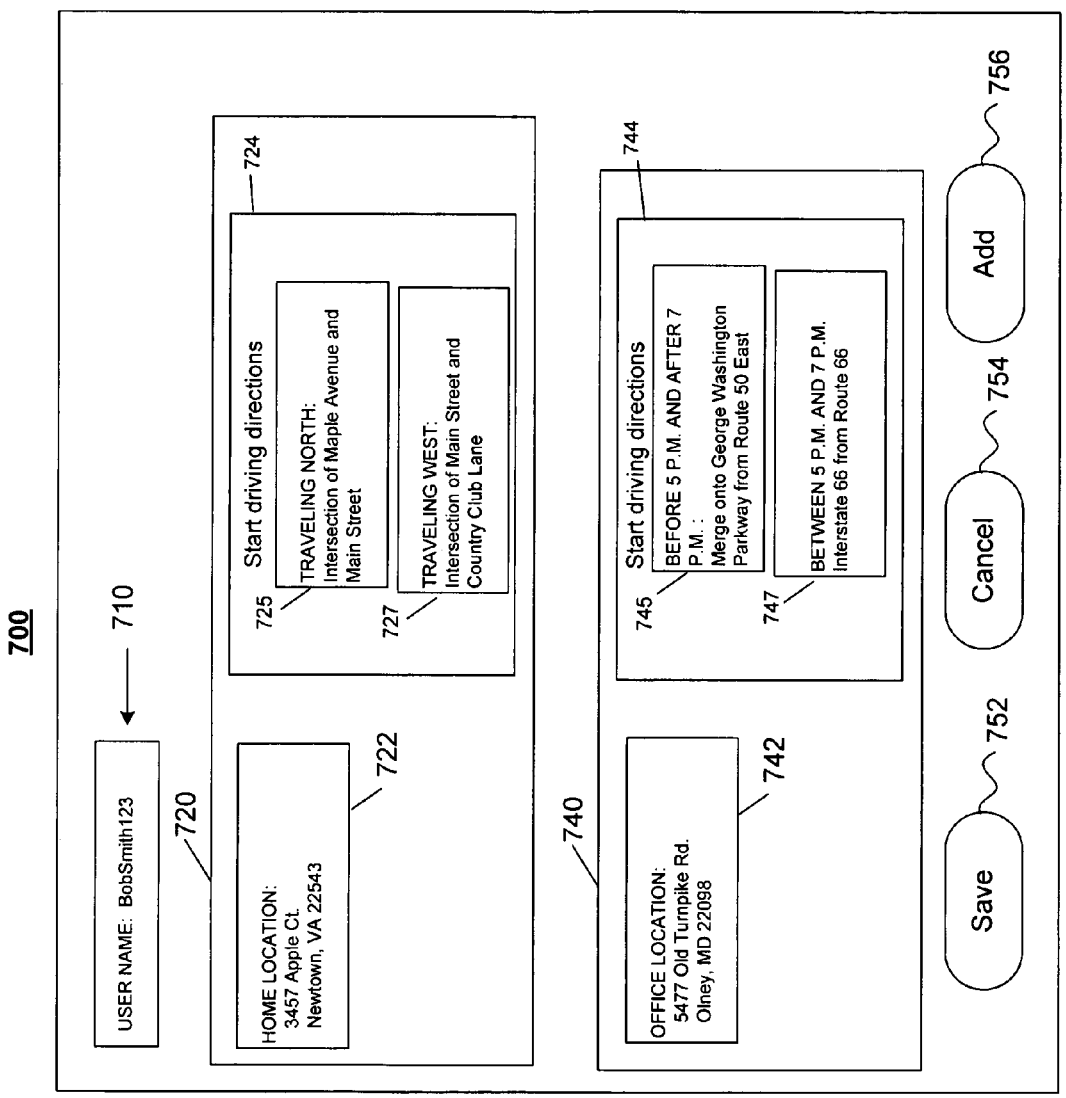
FIG. 7 is a block diagram of an exemplary interface for setting preferences, for a user account, to control substitution of a surrogate origin for a user-identified origin.

FIG. 7 depicts an exemplary graphical user interface 700 for a communications system capable of enabling a user to configure preferences for surrogate origins for routes requested by the user from particular origins.

The user interface 700 includes an account identification window 710 that identifies the user account for which surrogate origin preferences identified in the user interface 700 are to be applied when a route is requested from an origin that is identified in the user interface 700. The user interface 700 also includes windows 720 and 740 that each identify an origin location in a location window 722 or 742, respectively. When a user associated with the user account 710 requests a route from an origin identified in the location window 722 or 742, the preferences identified in a preference window 724 or 744, respectively, are applied to determine whether a surrogate origin is to be substituted for the identified origin. In some implementations, a substitute origin is applied only when requested or confirmed by a user who requests driving directions.

In the example of the user interface 700, the location window 722 identifies a home address 722A, as noted by the location type indicator 722B. A preference window 724 is associated with the location window 722 and identifies a preference to be applied to a route that originates from the home address 722A. The preference window 724 presents surrogate origins that have been identified by the user. As shown, when traveling north relative to the home address 722A, the surrogate origin 725 is to be substituted for the home address 722A and driving directions are to be presented starting from the surrogate origin 725. Also as shown, option 727 indicates that, when traveling west relative to home address 722A, the surrogate origin 727 is to be substituted for the home address 722A and driving directions are to be presented starting from the surrogate origin 727.

Similarly, the location window 740 identifies an office address 742A where a user associated with the identified user account 710 works or travels frequently, as shown by the location type indicator 742B. The preference window 744 identifies a surrogate origin 745 to be used when traveling during most times of the day (i.e., other than between 5 p.m. and 7 p.m.) and a different surrogate origin 747 to be used when traveling between 5 p.m. and 7 p.m. In this example, the surrogate origin 747 minimizes exposure to traffic congestion during a rush hour period and the surrogate origin 745 represents an more direct route from the location 740 that is preferred when the route is not congested.

The user interface 700 also includes a save control 752 to persistently store the surrogate origins in electronic storage and remove the interface 700 from display, and a cancel control 754 to remove the interface 700 from display without saving newly entered surrogate origins. The user interface 700 further includes an add control 756 operable to enable a user to identify a new location and/or new surrogate origins for the user account 710.

In this or other implementations, the mapping system may check to determine whether a surrogate origin is applicable to an identified origin location and may prohibit an inappropriate or unusable preference from being associated with the user account. To illustrate using the preference 729A identified in preference window 724, the mapping system may prohibit the user from saving the preference 729A if the mapping system determines that the surrogate origin is not within a predetermined distance of the home address 722A.

Additionally or alternatively, the mapping system may display a message indicating that the preference is inappropriate or unusable and suggest an alternative preference.

The ability to identity a surrogate origin based on travel direction or time of day during which travel is to occur may help improve user satisfaction with the mapping system.

Figure 8:
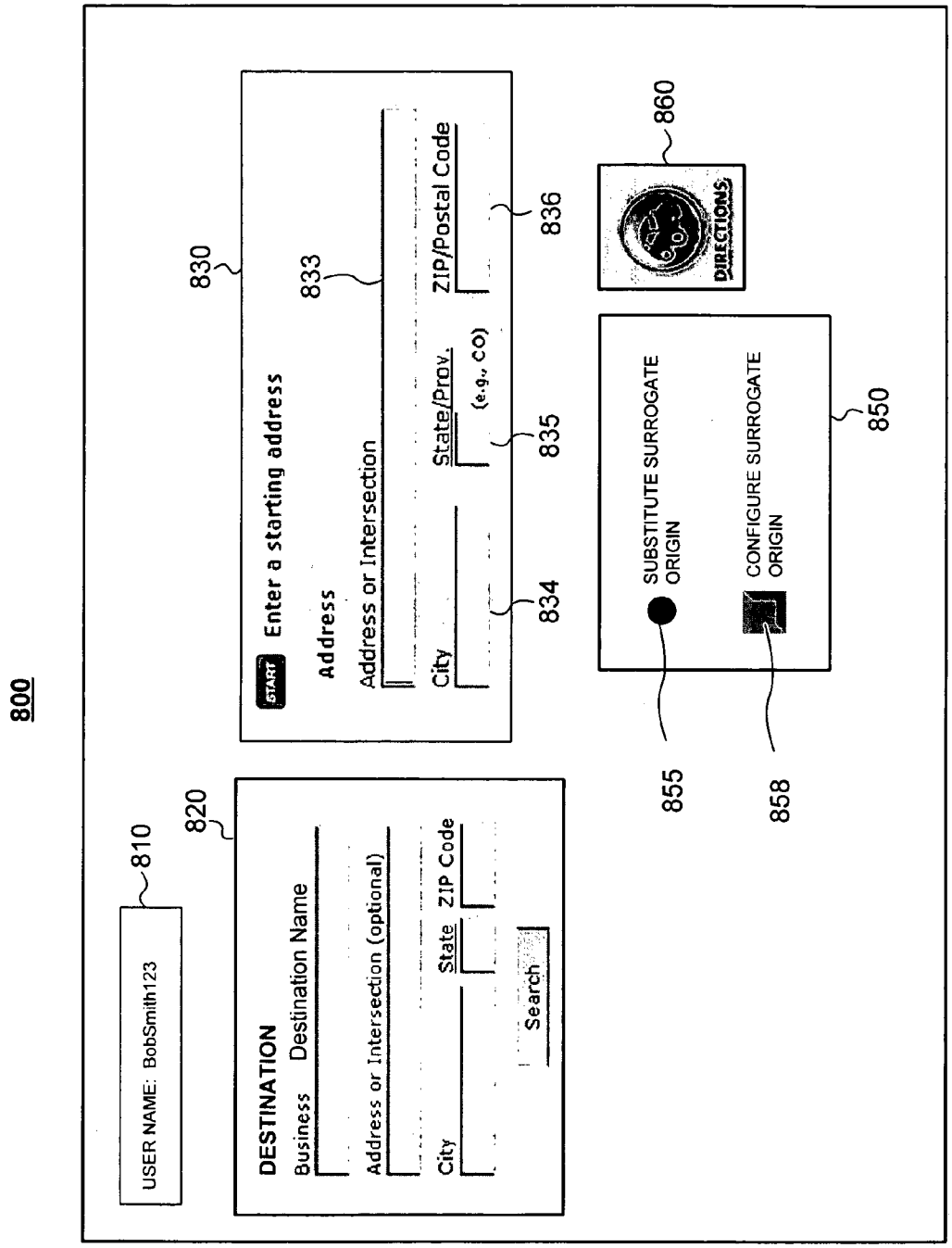
FIG. 8 is a block diagram of an exemplary interface for obtaining driving directions for a route in which a surrogate origin is substituted for a route origin.

FIG. 8 shows another exemplary user interface 800 for a communications system capable of substituting a surrogate origin for a route origin. The user interface 800 may be presented to a user wishing to obtain suggested driving directions between an origin and a destination.

The user interface 800 includes a user identification portion 810 identifying a user who is signed on to the mapping system. The user interface 800 also includes a destination selection portion 820 that enables a user to identify a destination for which mapping information is to be provided. The destination selection portion 820 includes a destination name field 822, an address or intersection field 823, a city field 824, a state field 825, and a zip code field 826.

The user interface 800 also includes an origin portion 830 that enables a user to identify an origin or starting address for which the driving directions are to be provided. The origin portion 830 includes an origin address or intersection field 833, a city field 834, a state field 835, and a zip code field 836 to identify the origin.

The user interface 800 also includes a surrogate preference window 850 that enables a user to specify that a surrogate origin previously identified in the user account 810 is to be used by activating control 855. The window 850 also includes a control 857 operable to display an interface that enables a user to configure the user account 810 with a surrogate origin, such as user interface 700 of FIG. 7.

The user interface 800 also includes a driving direction control 860 operable to cause a determination as to whether a surrogate origin associated with the user account 810 is to be substituted for the origin specified in the origin portion 830 and, if so, to cause the generation of a route between the surrogate origin and the destination specified in the destination selection portion 820. Based on a determination that a surrogate origin is not to be substituted, the driving direction control 860 causes the generation of a route between the origin specified in the origin portion 830 and the destination specified in the destination selection portion 820.

Figure 9:
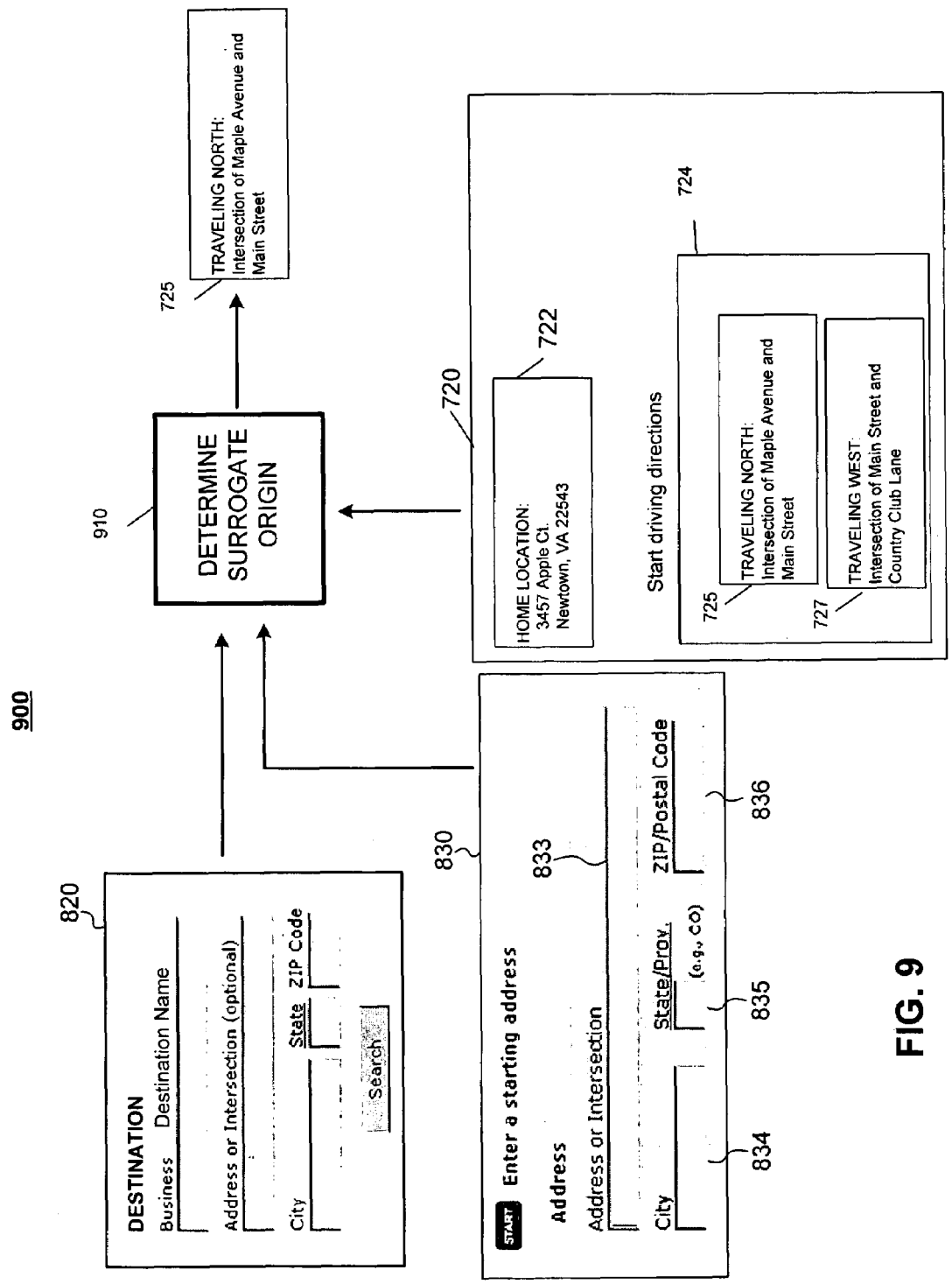
FIG. 9 is a block diagram of a process flow for substituting a surrogate origin for a user-entered origin.

FIG. 9 illustrates an example 900 showing a process flow of substituting a surrogate origin for a user-entered origin in a mapping system. In this example, a process 910 that is being executed on a mapping system, to determine a substitute origin receives a user-entered origin 820 and a user-entered destination 830. The mapping system executing the process 910 accesses user account information 720 and determines that surrogate origins 725 and 727 are associated with an address 722 corresponding to the user-entered origin 820. The mapping system compares the location of the user-entered origin 820 with the location of the user-entered destination 830 to determine the general compass direction being traveled and selects the surrogate origin 725 or 727 based on the general compass direction being traveled. For example, when the mapping system determines that a generally northward direction is traveled from the user-entered origin 820 to the user-entered destination 830, the mapping system selects the surrogate origin 725, and when the mapping system determines that a generally westward direction is traveled from the user-entered origin 820 to the user-entered destination 830, the mapping system selects the surrogate origin 727. In some implementations, when a surrogate origin is not associated with a determined travel direction, the mapping system may compare the location of each of the surrogate origins with the user-entered destination and select the surrogate origin that is closest to the user-entered destination 830. In the example 900, the mapping system determines that the compass direction being traveled is northward and selects the surrogate origin 727 to be substituted for the user-entered origin 820.

Techniques for generating a travel route from a surrogate origin to a travel destination have been generally described in terms of a user-identified origin. The techniques are applicable to an origin that is programmatically identified or received, such as from a global positioning system. A global positioning system may determine a geographic location of a device and the determined geographic location may be used as the origin for which a surrogate origin is substituted. This may be useful, for example, as part of a portable navigation system or an on-board navigation system, where a user is not required to enter a starting location for a route.

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method, performed at least partially on a computer, for enabling display of a route, the method comprising:
   storing a surrogate origin in a computer storage medium in response to a user identification of the surrogate origin;
   receiving an origin;
   accessing mapping information stored in a computer storage medium;
   identifying the surrogate origin stored in response to the user identification of the surrogate origin as a surrogate origin for the received origin;
   determining a route from the identified surrogate origin to a destination; and
   enabling display of the determined route.

2. The method of claim 1 wherein the mapping information comprises a routing graph representing a network of roads including two or more nodes and one or more links, with each link being associated with at least two nodes.

3. The method of claim 1 wherein receiving an origin comprises determining the origin based on a default origin.

4. The method of claim 3 wherein determining the origin comprises:
   receiving an indication of an identity associated with a requester of directions; and
   setting the origin to be a default origin associated with the identity.

5. The method of claim 1 wherein receiving an origin comprises receiving an indication of a geographic location of a navigation device.

6. The method of claim 1 further comprising:
   accessing information, stored in a computer storage medium, that is associated with a user identity on behalf of which the route is being enabled for display,
   wherein identifying a surrogate origin comprises identifying a surrogate origin from the accessed information that is associated with the user identity.

7. The method of claim 1 wherein enabling display of the determined route comprises communicating the route to a user system associated with a requester of directions.

8. The method of claim 1 further comprising generating a set of maneuvers to be executed to traverse the route from the origin to the destination.

9. The method of claim 8 further comprising enabling identification of the surrogate origin through inspection of the set of maneuvers generated.

10. The method of claim 1 wherein storing the surrogate origin in the computer storage medium comprises storing the identified surrogate origin in association with an identity associated with the requester of directions.

11. The method of claim 1 wherein identifying a surrogate origin for the received origin comprises enabling a requester of directions to identify one of multiple presented locations as the surrogate origin.

12. The method of claim 1 wherein the surrogate origin is stored in association with a particular location or address, the method further comprising identifying the surrogate origin as the surrogate origin for the received origin conditioned on whether the received origin is associated with the particular location or address associated with the surrogate origin.

13. The method of claim 1 wherein:
    storing the surrogate origin comprises enabling a person to identity a default surrogate origin to be used as the surrogate origin when a destination is located in a particular travel direction with respect to the received origin; and
    identifying the surrogate origin for the received origin comprises using the default surrogate origin for the received origin conditioned upon on whether the destination is located in the particular travel direction with respect to the received origin.

14. A method, performed at least partially on a computer, the method comprising:
    receiving an origin;
    accessing mapping information stored in a computer storage medium;
    identifying a surrogate origin for the received origin, wherein identifying the surrogate origin for the received origin comprises enabling a requestor of directions to identify the surrogate origin; and
    using the mapping information to determine a route from the surrogate origin to a destination.

15. A method, performed at least partially on a computer, the method comprising:
    receiving an origin;
    accessing mapping information stored in a computer storage medium;
    generating a set of maneuvers to be executed to traverse a route from the received origin to the destination;
    enabling identification of a surrogate origin for the received origin through inspection of the set of maneuvers generated;
    identifying the surrogate origin for the received origin; and
    using the mapping information to determine a route from the surrogate origin to a destination.

* * * * *